UNITED STATES PATENT OFFICE.

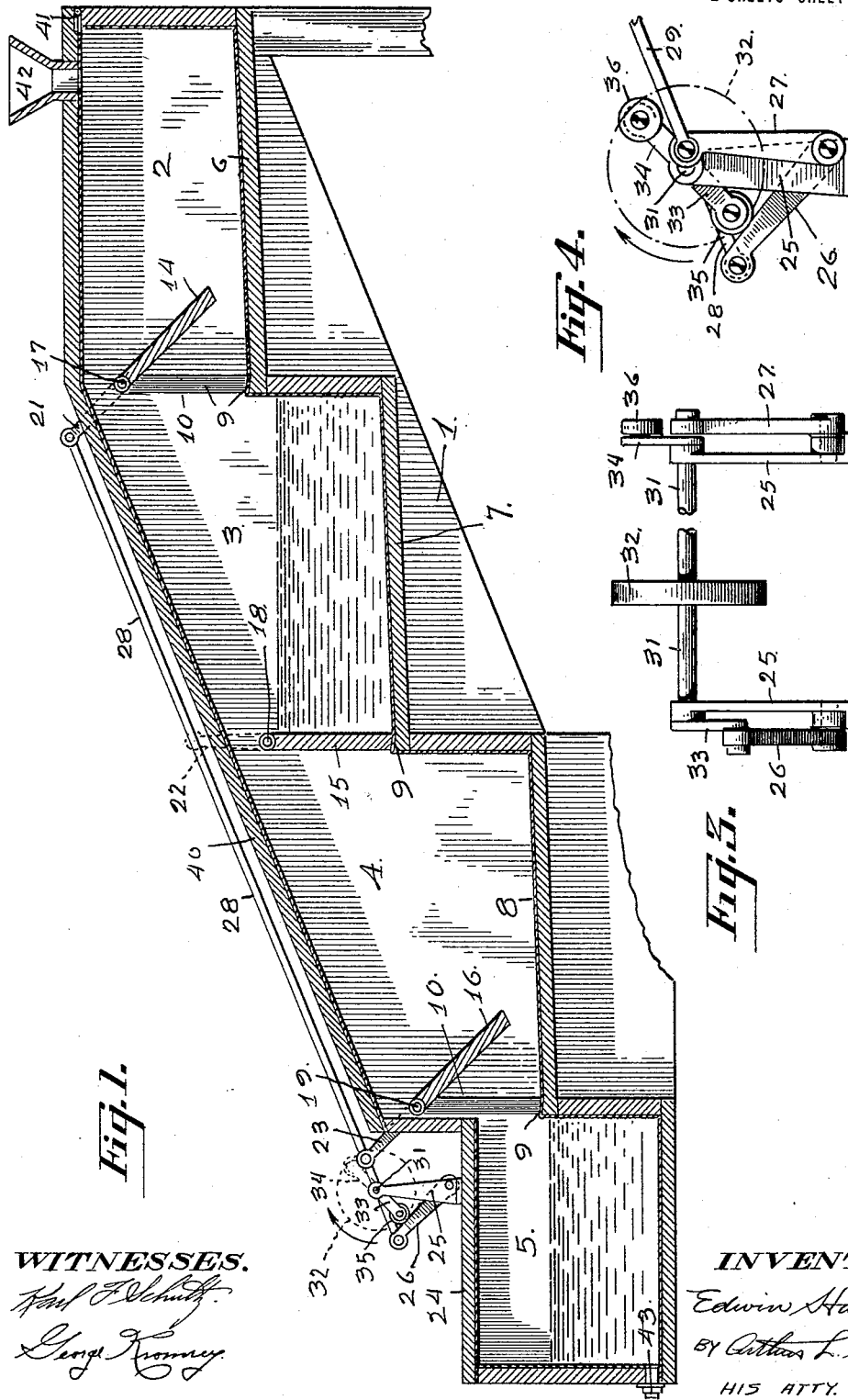

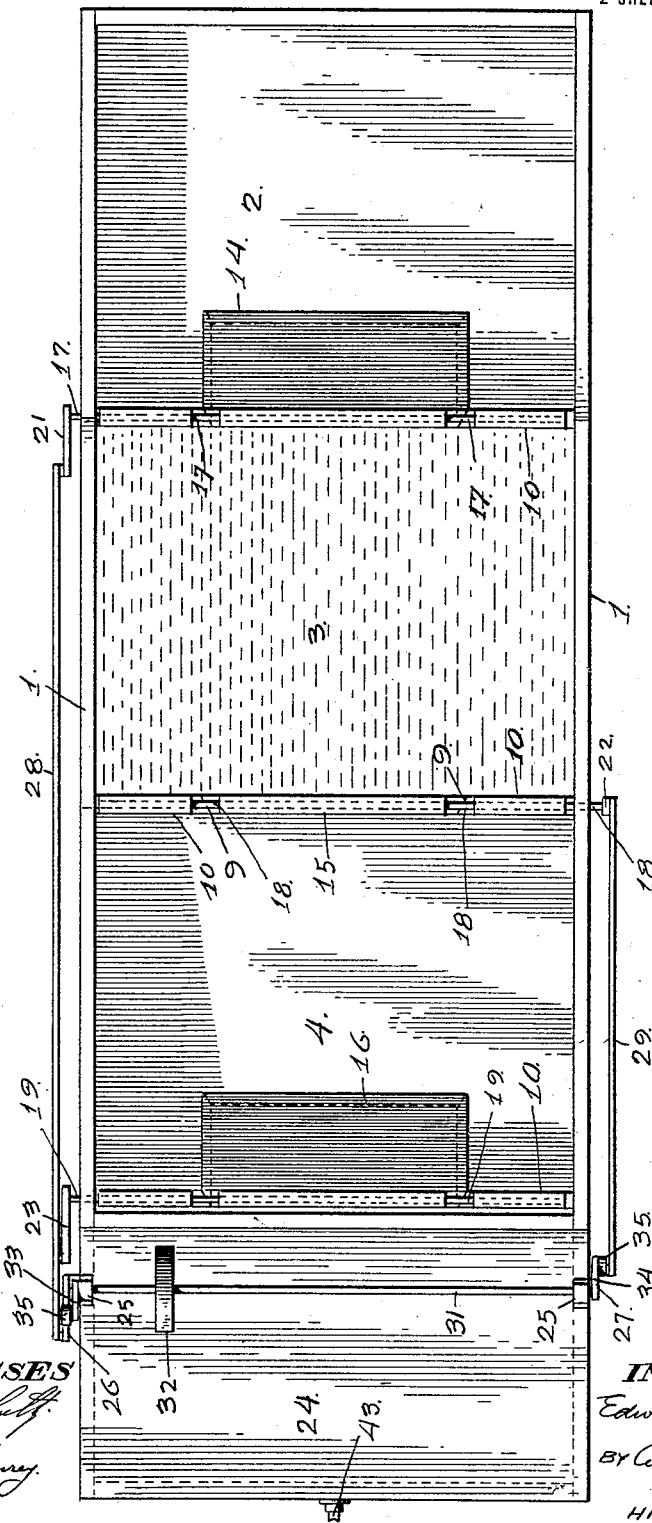

EDWIN HAUK, OF SAN FRANCISCO, CALIFORNIA.

MILK-RETARDER.

1,177,621.   Specification of Letters Patent.   Patented Apr. 4, 1916.

Application filed January 23, 1915. Serial No. 4,962.

*To all whom it may concern:*

Be it known that I, EDWIN HAUK, a citizen of the United States, residing in the city and county of San Francisco and State of California, have invented a new and useful Improvement in Milk-Retarders, of which the following is a specification.

My invention relates to milk retarders wherein a series of successive insulated compartments are arranged to retard the passage or flow of milk from the pasteurizer to the cooler; and the objects of my invention are first, to provide an improved retarder arranged to retard the passage of milk from the pasteurizer in order that the temperature of the said milk may be maintained over a comparatively long period; second, to provide improved and simple means for releasing the milk from one compartment into the next; and third, to provide improved means for releasing the milk from alternate filled compartments into alternate empty compartments. I accomplish these several features by means of the device disclosed in the drawings forming a part of the present specification wherein like characters of reference are used to designate similar parts throughout the said specification and drawings and in which—

Figure 1 is a broken longitudinal sectional view of the retarder disclosing a compartment filled with milk and the empty compartments with the gates thereof opened, Fig. 2 is a plan view of the retarder with the cover removed disclosing also a plan view of the mechanism whereby the gates are operated, Fig. 3 is an enlarged detailed view of the gate operating mechanism in elevation, and Fig. 4 is an end elevation of Fig. 3.

In the present state of the art before going to the cooler the milk is first run through the pasteurizer for the purpose of destroying the germs therein. Within limits, what a higher temperature will accomplish if maintained for a very short time, may be effected by a lower temperature continued over a longer period. Consequently, with a lower temperature the same results may be obtained, and a pasteurizer of less capacity may be employed, also a saving in the heat producing means or fuel may be effected, if the heated milk is received from the pasteurizer and the temperature continued over a longer period in a separate device.

Referring to the drawings, the numeral 1 is used to designate the body of the retarder having a series of successive insulated compartments 2, 3 and 4 and a receiver 5, each compartment being slightly lower than the one preceding, the compartments 2, 3 and 4 being provided with the slightly inclined bottoms 6, 7 and 8 respectively. An opening having beveled or chamfered edges 9 is formed in that wall 10 of each compartment adjacent to the compartment below it.

Hingedly mounted within the openings of the walls 10 are the gates 14, 15 and 16, having chamfered or beveled edges arranged to engage the chamfered or beveled edges 9 of the openings within the walls 10 and to be retained in such engagement by the pressure of the milk within that compartment. The pintles 17 and 19 of the gates 14 and 16, respectively, are extended beyond one side while the pintle 18 of the gate 15 is extended beyond the other side of the retarder 1. To the ends of the pintles 17 and 19 are secured the arms 21 and 23, respectively, while a similar arm 22 is secured to the pintle 18 of the gate 15.

On the cover 24 of the receiving compartment 5 are rigidly secured standards 25 on the lower portions of which are rotatably mounted the arms 26 and 27. A rod 28 connects the arms 21 and 23 of the gates 14 and 16 respectively, with the arm 26 while a similar rod 29 connects the arm 22 with the arm 27.

Rotatably mounted within the upper ends of the standards 25 is a shaft 31 having a suitable drive wheel 32 secured thereto. Diametrically opposed levers 33 and 34, having rollers 35 and 36 respectively, are secured at opposite ends of the shaft 31 so that when the said shaft 31 is rotated at a very low rate of speed, in the direction indicated by the arrow in Fig. 1 of the drawings, the roller 35 on the lever 33 will engage the arm 26 and move the said arm 26, and the arms 21 and 23 operatively connected thereto, and open the gates 14 and 16, the gate 15 remaining closed. Similarly, when the roller 36 of the lever 34 engages the arm 27 the gate 15, operatively connected thereto, will be opened, the gates 14 and 16 meanwhile remaining closed. The weight of the gates and the pressure of milk is normally sufficient to keep the same closed when released by the arms on the shaft 31.

A funnel 42 or similar contrivance will serve to introduce the heated milk from the pasteurizer, not shown, to the retarder, while an outlet pipe 43 will serve to deliver the milk from the receiver 5 of the retarder to the milk cooler.

The operation is as follows:—The heated milk from the pasteurizer is introduced through the funnel 42 into the compartment 2 of the retarder 1, the gate 14 thereof being normally closed. The milk is retarded or retained within the compartment 2 until the roller 35 of the lever 33 engages the arm 26 and thereby opens the gates 14 and 16 permitting the milk to flow from the compartment 2 into the compartment 3, the gate 15 of the latter compartment being closed at this time. The milk is retained within the compartment 3 until the roller 36 of the lever 34 engages the arm 27 and opens the gate 15 thereby permitting the milk to flow from the compartment 3 into the compartment 4. The next semi-revolution of the drive shaft 31 will cause the roller 35 to engage the arm 26 and open the gates 14 and 16 as hereinbefore described permitting milk to flow from the alternate compartments 2 and 4 into the adjacent compartment 3 and the receiving compartment 5 below respectively, as disclosed in Fig. 1 of the drawings.

It is understood that the entire retarder 1 is constructed of a proper insulating material in order to properly retain the temperature of the milk.

I have provided a cover 40 for the compartments 2, 3 and 4 in order to provide ready access to the said compartments for cleansing purposes.

It is obvious from the foregoing that I have provided improved means for retarding the flow of milk from the pasteurizer to the cooler meanwhile retaining a comparatively low pasteurizing temperature within the said milk. It is also obvious that I have provided an improved milk retarder wherein milk is retarded and improved means for permitting the milk in alternate compartments to flow into the adjacent alternate compartments. It is also obvious that other mechanism may be employed to open the gates alternately; therefore, I do not wish to confine myself to the precise construction shown herein but rather to avail myself of any modification that may properly fall within the scope of my invention.

Having thus described my invention what I claim as new and desire to secure by Letters Patent is—

1. A milk retarder comprising a series of successive compartments, each compartment being lower than the one preceding and arranged to deliver milk to the one below it; means operatively connected to each compartment and arranged to normally retain the milk therein; and means arranged to release the milk retaining mechanism in alternate compartments and thereby permit the milk to flow from the said compartments to adjacent alternate compartments below them.

2. A milk retarder comprising a series of successive insulated compartments, each compartment being lower than the one preceding and arranged to deliver milk to the one below it; a gate hingedly mounted within one wall of each compartment and arranged to normally retain the milk therein; and means operatively connected to alternate gates and arranged to operate each alternate gate and permit the milk to flow from that compartment into the next compartment below it.

3. A milk retarder comprising a series of successive insulated compartments, each compartment being lower than the one preceding and arranged to deliver milk to the one below it; a gate having chamfered edges hingedly mounted within one wall of each compartment and arranged to normally retain the milk in that compartment; a rod on one side of the retarder operatively connected to each alternate gate; a second rod operatively connected to the remaining alternate gates; and means adapted to operate each rod, and the gates connected thereto, alternately thereby permitting the milk to flow from each alternate compartment into the other compartments at intervals.

4. A milk retarder comprising a series of successive insulated compartments, each compartment lower than the one preceding it and having a bottom slightly inclined toward the compartment below it and an opening having chamfered edges in that wall of each compartment adjacent to the compartment below it; a gate having chamfered edges hingedly mounted within the opening in each wall and arranged to be normally retained in said opening by the pressure of milk within that compartment; a rod operatively connected to each alternate gate; a second rod operatively connected to the remaining gates; and means arranged to operate each rod alternately and open the gates connected thereto thereby permitting the milk to flow from one compartment into the one below it at intervals.

In witness whereof I have hereunto set my signature in the presence of two subscribing witnesses.

EDWIN HAUK.

Witnesses:
F. W. KELLEHER,
J. Y. BEDELL.